United States Patent
Croxford et al.

(10) Patent No.: US 11,138,812 B1
(45) Date of Patent: Oct. 5, 2021

(54) IMAGE PROCESSING FOR UPDATING A MODEL OF AN ENVIRONMENT

(71) Applicant: Arm Limited, Cambridge (GB)

(72) Inventors: Daren Croxford, Swaffham Prior (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/831,363

(22) Filed: Mar. 26, 2020

(51) Int. Cl.
*G06T 19/20* (2011.01)
*G06T 19/00* (2011.01)
*G06N 7/00* (2006.01)
*G06N 20/00* (2019.01)

(52) U.S. Cl.
CPC ............. *G06T 19/20* (2013.01); *G06N 7/005* (2013.01); *G06N 20/00* (2019.01); *G06T 19/006* (2013.01); *G06T 2219/2004* (2013.01)

(58) Field of Classification Search
CPC ....... G06T 19/20; G06T 19/006; G06N 20/00; G06N 7/005
USPC ........................................................ 345/419
See application file for complete search history.

(56) References Cited

U.S. PATENT DOCUMENTS

| 3,632,865 A * | 1/1972 | Haskell | G06T 7/254 375/240.12 |
| 2014/0114888 A1* | 4/2014 | Noda | G06N 20/00 706/12 |
| 2019/0034734 A1* | 1/2019 | Yen | G06T 7/246 |

* cited by examiner

*Primary Examiner* — Hai Tao Sun
(74) *Attorney, Agent, or Firm* — EIP US LLP (57) ABSTRACT

Examples of the present disclosure relate to methods for performing image processing. In one such example, a model of an environment is stored. Image data representative of a captured observation of the environment is obtained and the image data is processed using an object classifier to determine whether one or more objects belonging to a plurality of predetermined classes of objects is present in the environment. The stored model is updated based on the processing. In response to determining at least one of the one or more objects is present, object class characteristic data indicative of a characteristic of the at least one object that is determined to be present is retrieved and a probability of change associated with the at least one object is determined on the basis of the object class characteristic data. The updating of the stored model is adjusted based on the determined probability of change.

19 Claims, 3 Drawing Sheets

IMAGE PROCESSING FOR UPDATING A MODEL OF AN ENVIRONMENT

BACKGROUND OF THE INVENTION

Field of the Invention

The present disclosure relates to image processing, particularly in relation to models of real-world environments.

Description of the Related Technology

Models of real-world environments may be used for many different purposes, for example in various augmented reality (AR) and/or virtual reality (VR) applications.

Processing sensor-originated data, such as image data, in relation to AR environments involves rendering one or more virtual objects in the (physical) real-world environment to create a composite view for the user in which reality is enhanced by the one or more virtual objects. An alternative term for AR is "mixed reality" (MR) which references the merging of real and virtual worlds.

The one or more virtual objects may comprise visual information, for example in the form of images, which could be text or simple icons in some cases or more complex moving "avatars" in other cases.

Overlaying the visual information onto the physical environment can be done constructively (by adding to the natural environment) or destructively (by subtracting from, or masking, the natural environment). AR thus alters a user's perception of their real-world environment, whereas virtual reality (VR) replaces their real-world environment with an entirely simulated (i.e. computer generated) one.

SUMMARY

According to a first aspect of the present disclosure, there is provided a method of image processing comprising:
storing a model of an environment;
obtaining image data representative of a captured observation of the environment;
processing the image data using an object classifier to determine whether one or more objects belonging to a plurality of predetermined classes of objects is present in the environment;
updating the stored model based on the processing;
in response to determining that at least one of the one or more objects is present, retrieving object class characteristic data indicative of characteristic of the at least one object that is determined to be present and determining a probability of change associated with the at least one object on the basis of the object class characteristic data; and
adjusting the updating of the stored model based on the determined probability of change.

According to a second aspect of the present disclosure, there is provided an apparatus for processing image data, the apparatus comprising:
storage to store a model of an environment;
a receiver to receive image data representative of a captured observation of the environment; and
a processor arranged to:
process the image data to determine whether one or more objects belonging to a plurality of predetermined classes of objects is present in the environment;
update the stored model based on the processing;
retrieve, in response to the object classifier determining that at least one of the one or more objects is present, object class characteristic data indicative of a characteristic of the at least one object that is determined to be present;
determine a probability of change associated with the at least one object based on the object class characteristic data; and
adjust the updating of the stored model based on the determined probability of change.

According to a third aspect of the present disclosure, there is provided a non-transitory computer-readable medium comprising computer-executable instructions which, when executed by a processor of a computing device, cause the processor to perform a method comprising:
storing a model of an environment;
obtaining image data representative of a captured observation of the environment;
processing the image data using an object classifier to determine whether one or more objects belonging to a plurality of predetermined classes of objects is present in the environment;
updating the stored model based on the processing;
in response to determining that at least one of the one or more objects is present, retrieving object class characteristic data indicative of a characteristic of the at least one object that is determined to be present and determining a probability of change associated with the at least one object on the basis of the object class characteristic data; and
adjusting the updating of the stored model based on the determined probability of change.

Further features and advantages will become apparent from the following description of embodiments, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Models of physical environments may be used for many different computational purposes, for example in various augmented reality (AR) and/or virtual reality (VR) applications. Modeling a real-world environment (or "scene") involves analysis of the environment to be modeled. For example, the environment may be scanned in multiple dimensions with an image sensor and/or a depth sensor to obtain information about the environment for modeling. The amount of computational resource involved in performing such scene analysis can be considerable e.g. consuming a considerable amount of compute resources and power.

Thus, generating or updating a model of an environment—e.g. as part of the scene analysis—can be a computationally expensive task, requiring relatively large amounts of processing power and/or storage. Such tasks may also be carried out on portable devices, e.g. a mobile device, which have limited onboard computational resources.

The present disclosure provides systems and methods which may be implemented to update a stored model of an environment based on captured observations of the environment, and adjust the updating of the model of an environment based on probabilities of change, e.g. motion, determined for object classes recognized in the environment. Updating at least part of the model can mean that the model includes more recently obtained model data such that the model is more relevant, e.g. when using the model in processing applications such as AR experiences. For example, a scene may not even have changed between one version of the model of the environment and an updated version of the model. However, the updated version of the model may be more relevant when using the model to do processing in the context of the environment, e.g. for an AR application running "live" in a real-world environment. An outdated model, e.g. one which has been downloaded for the type of environment rather than obtained by scanning the actual physical environment, may not be representative of the current state of the environment and so may cause issues when the model is used in processing applications such as AR experiences.

Updating the model can involve re-scanning at least part of the environment and re-generating the model for the said at least part of the environment, for example. Adjusting the updating of the model based on how likely to change the objects in the environment are—e.g. how likely it is that one or more given objects are going to move in the environment and thus change their location in the environment and the scene—allows for any processing resources involved in updating the model to be focused in regions of the model corresponding to objects that are more likely to change, e.g. move. This may allow for an overall reduction in processing resources for keeping the model up to date as a whole. Furthermore, such focusing of processing resources involved in updating the model on regions of the model that are more likely to change in the near future may additionally, or alternatively, allow for an increase in available processing resources for those more volatile regions of the model, thereby allowing for more efficient and/or effective modeling in those regions. In turn, this can reduce the processing requirements, energy expenditure, and/or power consumption involved.

The present systems and methods may thus provide improvements in updating a model representation of a physical environment, e.g. for use in further processing applications such as AR or MR environments, compared to known systems and methods.

Figure 1:
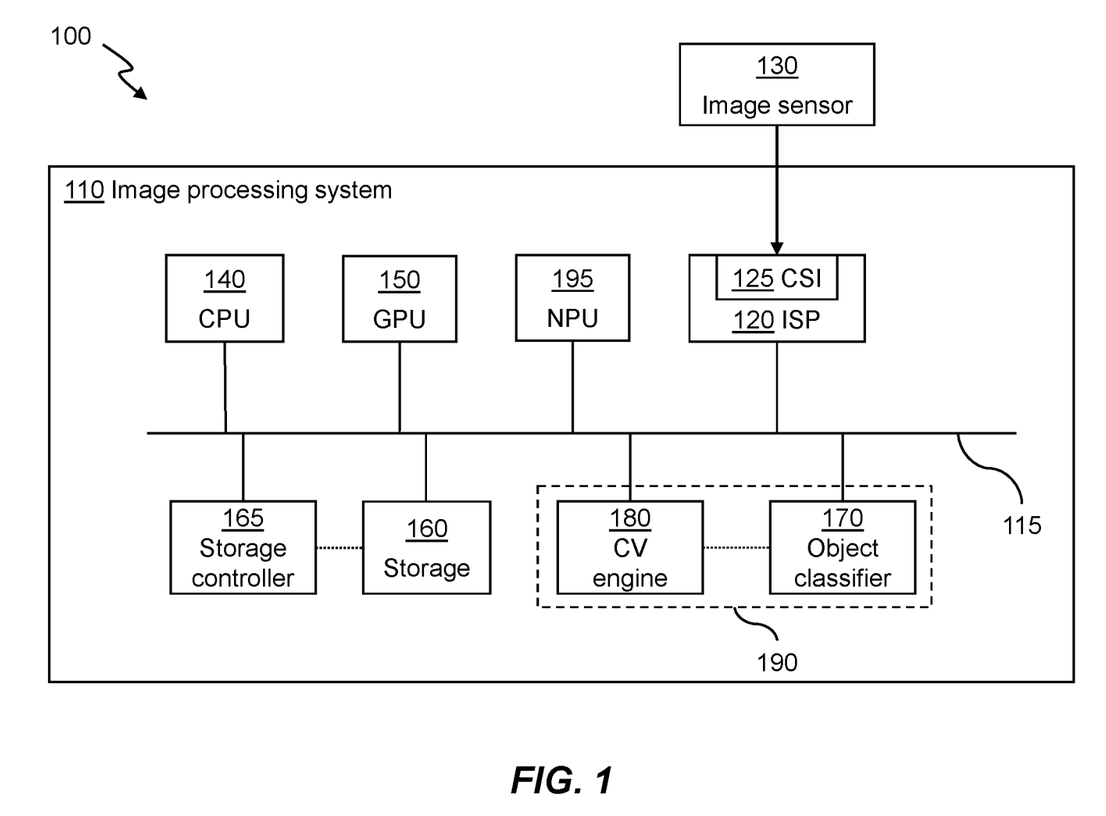
FIG. 1 is a schematic diagram illustrating an apparatus for processing image data according to examples.

FIG. 1, provided for context, shows schematically a system 100 for implementing an image processing pipeline. The system 100 may form part of virtual reality (VR), augmented reality (AR), mixed reality (MR) and/or computer vision (CV) equipment. Some or all the components of the system 100 may be comprised in a wearable device such as a head-mounted device (HMD) or smart glasses. The system 100 may form part of robotic mapping and/or navigation equipment, autonomous vehicle equipment, and/or unmanned aerial vehicle equipment. The system 100 may form part of other image processing arrangements in other examples. For example, the system 100 may form part of a television, mobile device or video gaming equipment.

The system 100 comprises an image processing apparatus 110. The image processing apparatus 110 is arranged to receive, process, generate, store and/or output image data. The image processing apparatus 110 may form part of, or comprise, a system on a chip (SoC) arrangement.

The image processing apparatus 110 comprises a plurality of processor components that are communicatively interconnected via at least one systems bus 115. The at least one systems bus 115 may be, or include, any suitable interface or bus that allows data to be transferred between the various components of the image processing apparatus 110. For example, an ARM® Advanced Microcontroller Bus Architecture (AMBA®) interface, such as the Advanced eXtensible Interface (AXI), may be used.

Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the apparatus 110 comprises computer-useable volatile and/or non-volatile storage configured to store information and/or instructions for the processor components. The computer-useable volatile and/or non-volatile storage may be coupled with the bus 115. In examples, the computer-useable storage may comprise random access memory (RAM) and/or read-only memory (ROM).

In the example shown in FIG. 1, the image processing apparatus 110 comprises an image signal processor (ISP) 120 with a camera serial interface (CSI) 125, a central processing unit (CPU) 140, a graphics processing unit (GPU) 150, storage 160, a storage controller 165, an object classifier (170) and a CV engine 180 as part of an object detection system 190, and a neural processing unit (NPU) 195. Each of the ISP 120, CPU 140, GPU 150, NPU 195, CV engine 180, object classifier 170, and storage controller 165 may comprise a processor component of the apparatus 110. The apparatus 110 may comprise more, fewer and/or different components than those shown in the example of FIG. 1. For example, the apparatus 110 may comprise a display controller, a video decoder and/or one or more peripherals or input/output devices.

The storage controller 165 is coupled to the storage 160. The storage controller 165 is configured to manage the flow of data going to and from the storage 160. The storage 160 may comprise a main storage, otherwise referred to as a "primary storage". The storage 160 in this example is comprised in the image processing apparatus 110. For example, the storage 160 may comprise 'on-chip' storage. The storage 160 may for example comprise a magnetic or optical disk and disk drive or a solid-state drive (SSD). In some examples, the storage 160 comprises a synchronous dynamic random-access memory (SDRAM). For example, the storage 160 may comprise a double data rate synchronous dynamic random-access memory (DDR-SDRAM). In other examples, however, the storage 160 may be an external storage, in that the storage 160 is external to the image processing apparatus 110. For example, the storage 160 may comprise 'off-chip' storage. In such cases, the storage 160 may comprise a central storage of a computing device within which the apparatus 110 is located. The storage 160 may have a greater storage capacity than the storage cache(s) of the CPU 140 and/or the GPU 150. In some cases, the storage 160 may be distributed between storage comprised in the image processing apparatus 110 and storage external to the image processing apparatus 110, e.g. between 'on-chip' storage and 'off-chip' storage. The storage 160 may be arranged to store image data corresponding to one or more images, each image corresponding to a different frame in a video. The stored image data may correspond to successive images in a video stream. The storage 160 may comprise a framebuffer arranged to store the image data.

The ISP 120 is configured to receive signal data from a sensor. In the example shown in FIG. 1, the ISP 120 is configured to receive image data from an image sensor 130 communicatively coupled to the ISP 120. The sensor 130 may be comprised in an image capture device, e.g. a camera. For example, the sensor 130 may be comprised in an "over the ear" camera, or as part of a pair of "smart glasses", arranged to capture a representation of a scene that is being viewed by a viewer. The received signal data may comprise analog or digital data. Such an image sensor 130 may comprise a plurality of sensor pixels, a given sensor pixel being configured to output signal data corresponding to that sensor pixel. The signal data received by the ISP 120 may comprise raw sensor data. For example, the sensor data may comprise raw image data. Raw image data comprises unprocessed or minimally processed data generated by an image sensor. The ISP 120 may be configured to process image data received from the sensor 130, e.g. via the CSI 125. In this way, image data captured by the image sensor 130 can be transferred to the ISP 120, where the ISP 120 can perform initial processing of the image data (such as individual frames of a video) to prepare an image or video for display or for further processing (e.g. to update a topological model described herein). For example, the ISP 120 may perform saturation correction, renormalization, white balance adjustment and/or demosaicing, although this is not to be taken as limiting.

In some examples, the ISP 120 is configured to receive and process image data from a video decoder (not shown). The video decoder may be configured to receive encoded image or video data and decode the received encoded data. The video decoder may output decoded image data. The video decoder may be used in addition to, or instead of, the image sensor 130 according to some examples. For example, the system 100 may be used to implement video playing, camera recording, and/or video conferencing applications. In such cases, a video stream may be obtained which is encoded, e.g. by an MPEG standard. The video stream may be decoded by the video decoder as part of the image processing system 110 before computer vision, or other processing on the video frames, is performed.

The ISP 120 is configured to output processed data to the storage 160 via the bus 115 and storage controller 165. For example, the processed data may be output to a framebuffer in the storage 160.

The CPU 140 may comprise an image or video processor configured to process image or video data. The CPU 140 may be equipped with various image processing-related functionality. For example, the CPU 140 may be configured to perform object detection and/or recognition tasks, etc. The CPU 140 may be configured to obtain image data from the storage 160, or from the ISP 120. The CPU 140 may be configured to output processed data to the storage 160 via the bus 115 and/or storage controller 165.

The GPU 150 is configured to process image or video data. The GPU 150 may comprise a greater number of processing units (or "cores") than the number of cores in the CPU 140. Each of the cores of the GPU 150 may, individually, be relatively slow and/or unsophisticated compared to any of the cores of the CPU 140. A given core of the GPU 150 may therefore be less suitable for performing complex computational tasks compared with a given core of the CPU 140. However, the relatively large number of cores in the GPU 150 enables certain computational tasks, for example tasks with a relatively high degree of parallelism, to be performed more efficiently by the GPU 150 than by the CPU 140—since a relatively large number of processes may be carried out in parallel by the GPU 150. Examples of image-related computational tasks that may be performed more efficiently by the GPU 150 than by the CPU 140 include, but are not limited to, image rendering processes such as texture mapping, rendering polygons, shading, geometric calculations and motion compensation. The GPU 150 may be configured to perform object detection and/or recognition tasks. The GPU 150 may also be used to perform tasks that are not image related. The GPU 150 may be configured to obtain image data from the storage 160. In some examples, the GPU 150 obtains image data directly from the CPU 140 or a further processing unit such as the ISP 120. The GPU 150 is configured to process the image data, for example to generate a rendered image, and to output the generated data to the storage 160 via the bus 115 and/or storage controller 165. For example, the generated data may be stored in a framebuffer.

The NPU 195—also known as an artificial intelligence (AI) accelerator—comprises a specialized processing unit for performing machine learning tasks, e.g. by implementing a neural network or other machine learning model.

As described above, the apparatus 110 may include a display controller which is arranged to control the display of images and/or video, e.g. using a display device of the apparatus. An output of the display controller may be connected to a display driver, for example by a control line or wire. The display driver may include driver stages for converting the display data representative of an image or video to be displayed to appropriate voltages and/or signals for application to the display device. In this way, the display controller may control the display device to output an image representative of the topological model of the environment, or to output other images and/or video such as virtual objects as part of an AR application.

The object classifier 170 (or "object identification system", "object recognition system") may be configured to recognize instances of objects of a certain class in the real-world environment, e.g. image representations thereof. For example, the object classifier 170 may obtain sensor-originated data (e.g. image data) as input and determine whether one or more objects of a predetermined class are present in the sensor-originated data or the real-world environment represented thereby. For example, where the predetermined class is human faces, the object classifier 170 may be used to identify the presence of a human face in the captured image data, or in the real-world environment represented thereby. In some cases, an object classifier allows particular instances of the object class to be identified. For example, the instance may be a particular human face. Other examples of such object recognition include recognizing instances of expressions (e.g. facial expressions), gestures (e.g. hand gestures), audio (e.g. recognizing one or more particular sounds in an audio environment), heat signatures (e.g. recognizing objects such as faces in an infrared representation or "heatmap"). Thus, in examples, the type of "object" being recognized may correspond with the type of representation of the real-world environment. For example, for a visual or image representation of the real-world environment, the object recognition may involve recognizing particular articles, expressions, gestures, etc.

In examples, the object classifier 170 forms part of an object detection system (or "object detector") 190 configured to perform object detection. During object detection, an object is recognized and also localized in the environment, e.g. in an image representation thereof. For example, the object detection system 190 may process image data to determine a location of an object, as recognized by the object classifier 170, in the environment and/or a captured image thereof. For example, the recognized object may be localized relative to the environment, e.g. relative to a three-dimensional coordinate system projected onto the real-world environment, and/or relative to the captured image, e.g. relative to a two-dimensional coordinate system projected onto the image.

In some examples, object detection may involve detecting a motion of a recognized object. For example, as well as recognizing an instance of a particular type of object, e.g. a car, in an audiovisual representation of the real-world environment, the object detection system 190 may also detect or determine a motion of the object instance, e.g. the recognized car. Thus, object detection data—generated and possibly outputted by the object detection system 190—may include object motion data, e.g. where the object motion data is representative of a detected or determined motion of the detected object in the real-world environment. Such object motion detection may be performed as part of object tracking, for example, where an object in the environment is tracked over time.

The object detection system 190 may include a computer vision (CV) engine 180—as shown in the example of FIG. 1. The CV engine 180 is configured to process image or video data. In some examples, the CV engine 180 is comprised in the CPU 140 and/or the GPU 150. That is, CV functionality may be incorporated into one or more of the CPU 140, the GPU 150, and the NPU 195. In other examples, the CV engine 180 is a separate processing component. CV functionality may include the processing of image data to extract relatively high-level information describing the content of the image. High dimensional data may be extracted in order to produce numerical or symbolic information, e.g. in the form of decisions. The extracted information may be used in conjunction with decision-making processes to elicit actions and/or to further understanding of the image. CV functionality may include performing object detection and/or recognition. CV functionality may include other tasks such as motion estimation, scene reconstruction or image restoration.

In some examples, CV functionality includes performing simultaneous localization and mapping (SLAM). Performing SLAM involves generating and/or updating a map of an environment whilst simultaneously determining and/or tracking a location of a sensor within the environment. SLAM processing can involve identifying and locating objects in the environment and using those identified objects as semantic "landmarks" to facilitate more accurate and/or efficient mapping of the environment.

The CV engine 180 may be configured to obtain image data from the storage 160. In some examples, the CV engine 180 obtains image data directly from the CPU 140, GPU 150 or ISP 120. The CV engine 180 may process the image data, for example to perform object detection in the image, and to output data, e.g. data indicating detected and/or classified objects, to the storage 160.

Performing object detection and/or object recognition may involve the use of one or more trained artificial neural networks (ANNs) or support vector machines (SVMs). Using an ANN to perform object detection and/or recognition may increase an accuracy and/or reliability of object detection and/or recognition compared to some other known techniques. An ANN may be trained to detect (including locating) objects in an image, and/or to classify objects using a plurality of predefined object classes or types.

In examples, the object detection system 190 can thus include, or implement, a support vector machine (SVM) or an artificial neural network (ANN) to perform the object detection, though many other types of object detection system exist. For example, the object classifier 170 may comprise, or implement, an SVM or an ANN to perform the object recognition. The object recognition data may thus correspond to the output of an object recognition process performed by the object recognition system. Similarly, the CV engine 180 may comprise, or implement, an SVM or an ANN to provide CV functionality. In examples, such implementation of an SVM or an ANN may utilize the NPU 195. For example, in the case of an ANN being implemented, the NPU 195 may comprise a neural network accelerator to run the ANN.

An artificial neural network typically includes several interconnected nodes, which may be referred to as artificial neurons, or neurons. The internal state of a neuron (sometimes referred to as an "activation" of the neuron) typically depends on an input received by the neuron. The output of the neuron may then depend on the input, a weight, a bias and an activation function. The output of some neurons is connected to the input of other neurons, forming a directed, weighted graph in which vertices (corresponding to neurons) or edges (corresponding to connections) of the graph are associated with weights, respectively. The weights may be adjusted throughout training of the ANN for a particular purpose, altering the output of individual neurons and hence of the ANN as a whole.

The neurons may be arranged in layers such that information may flow from a given neuron in one layer to one or more neurons in a successive layer of the neural network. A convolutional neural network (CNN) typically includes an input layer, a plurality of convolutional layers, at least one fully connected layer and an output layer. The input layer may correspond with an input to the neural network, e.g. input image data. The convolutional layers typically extract particular features from the input data to create feature maps. The fully connected layer(s) can then use the feature maps for classification. A fully connected layer typically connects every neuron in one layer to every neuron in another layer. Fully connected layers may therefore be used to identify overall characteristics of an input, such as whether an object of a particular class, or a particular instance belonging to the particular class, is present in an input (e.g. image, video, sound) as part of an object classification process. Examples include an object classifier 170 executing in a neural network accelerator.

An ANN may be trained to perform object detection, classification, image segmentation, sound/speech recognition etc. by processing sensor-originated data, for example to determine whether an object of a predetermined class of objects is present in the real-world environment represented by the sensor-originated data. Training the ANN in this way may generate one or more kernels associated with at least some of the layers (such as layers of the ANN other than the input and output layers). Hence, the output of the training may be a plurality of kernels associated with a predetermined ANN architecture (for example with different kernels being associated with different respective layers of a multi-layer ANN architecture). The kernel data associated with a given layer may be considered to correspond to weight data representative of weights to be applied to data input to the given layer, e.g. image data, as each element of a kernel may be considered to correspond to a weight, respectively. In the case of image data, each of these weights may be multiplied by a corresponding pixel value of an image patch, to convolve the kernel with the image patch. Other layers of the ANN (e.g. a convolutional layer in a CNN) may process a feature map as input and the respective kernels associated with the layers may be convolved with such input feature maps (IFMs). One or more layers of the ANN may alternatively process probability values as input, e.g. probabilities output by a fully connected layer, such that the weights of a kernel associated with such a layer may be multiplied by the input probability values.

The kernels may allow features of the input to be identified. For example, in the case of image data, some of the kernels may be used to identify edges in the image represented by the image data and others may be used to identify horizontal or vertical features in the image (although this is not limiting: other kernels are possible). The precise features that the kernels are trained to identify may depend on the image characteristics, such as the class of objects, that the neural network is trained to detect. The kernels may be of any size. A kernel may sometimes be referred to as a "filter kernel" or a "filter". A convolution operation, performed during processing done by a CNN, generally involves a multiplication operation and an addition operation—sometimes referred to as a multiply-accumulate (or "MAC") operation. Thus, a neural network accelerator configured to implement an ANN may include a multiplier-accumulator (MAC) unit configured to perform these operations.

After the training phase, the artificial neural network (which may be referred to as a trained neural network) can be used to detect the presence of objects of a predetermined class of objects, e.g. in input images. This process may be referred to as "classification", as previously described with reference to object classification, or "inference". A classification process typically involves convolution of the kernels obtained during the training phase with portions of the sensor-originated input, e.g. image patches of an image input to the ANN, to generate a feature map. The feature map may then be processed using at least one fully connected layer, e.g. to classify the object; although other types of processing may be performed.

The storage 160 of the image processing system 110 is configured to store a model of an environment. The model, e.g. a topological model, of the environment may include a plurality of models, e.g. topological models, corresponding to a plurality of objects in the environment. In some examples, the model may simply include locations of different classified objects in the environment or a (2D) image thereof. For example, the model may comprise the information that a "chair" object is located at a bounding box with coordinates (20,10) to (40,50) in an image, and a "telephone" object is located at a bounding box with coordinates (25,15) to (35,45).

A (topological) model of an object or an environment is, for example, a representation of a geometry of a surface of the object or the environment, or a representation from which such a geometry can be derived or otherwise obtained. For example, a (topological) model of given object may be a surface model of the object, such as a mesh formed of a plurality of polygons, e.g. triangles or quadrilaterals. The polygons generally include vertices and may be defined by a position of their vertices in a given space. In other examples, the (topological) model may represent the surface of the given object using an oriented patched representation or a surfel (surface element) representation. In other cases, the (topological) model may be a volume model of the given object, in which a cross-sectional thickness of the object is modeled. A volume model may be represented using voxels, which correspond to respective positions within a regular, three-dimensional grid. The surface geometry of a given object can be obtained from a volume model of the object by extracting a surface contour or other representation corresponding to the surface of the volume model. This is not intended to be limiting, though, and further (topological) models may be generated in other examples. For example, the (topological) model of a given object may be, or comprise, a point cloud in which a set of points in a 3D space are used to represent a surface of the object.

A (topological) model of an object or an environment may be used for many different purposes. For example, a (topological) model of a person in a real-world environment could be used to generate an avatar of the person for use in various augmented reality (AR) or virtual reality (VR) applications, e.g. in a mixed reality (MR) version of the real-world environment.

AR can be used to enhance the real-world environments of users. For example, by using computer vision, object detection, and incorporating AR cameras into a portable device carried by a user (such as a smartphone running an AR application) the information about the surrounding real world of the user can become interactive and digitally manipulatable. Information about the environment and its objects can be overlaid on the real world as viewed by the user, e.g. via a display of the portable device. The information about the environment and its objects can be virtual or real. Augmentation of the environment is typically performed in real time.

Factors involved in running an AR environment include, but are not limited to, analysis of the real-world environment (or "scene"), locating an agent (e.g. a user) in the environment, accurate placement (e.g. overlay) of virtual objects in the environment; persistent virtual objects in the environment, and multiple agents (e.g. users) interacting with the same environment simultaneously.

The amount of computational resource involved in performing scene analysis alone is considerable and can therefore consume a considerable amount of compute resources and power. For example, generating a model of an environment as part of the scene analysis can be a computationally expensive task, requiring relatively large amounts of processing power and/or storage.

To generate a model of an environment—e.g. by scanning the environment with an image sensor and/or a depth sensor—pose data, representative of a pose of an agent during observation of an environment to be modeled, may be obtained. The agent may be a portable device, e.g. any device that can be carried or otherwise conveyed by a user, or a robot, for example. Such a portable device may be conveyed by the user themselves or by clothing or wearable accessories worn by the user. For example, a portable device may be a handheld device that is designed to be held in a user's hand during use. In other cases, the portable device may be a wearable device that may be attached to or otherwise supported by the user. For example, a wearable device may be fastened around or rested on a body part of the user, e.g. around a user's wrist, waist or ankle, or on a user's head. As an example, the portable device may be a smartphone or other portable communications device. In other examples, the portable device is an AR device, such as an AR headset.

The pose of an agent represents a position and orientation of the agent within the environment. The pose may be represented within any suitable coordinate system, e.g. for representing a three-dimensional space. The pose of the agent may be obtained in various ways, as discussed further below.

The environment may be any three-dimensional space, which is internal (e.g. inside a building) or external. The environment typically includes a lower surface, although this need not be the case. For example, the environment may be an aerial environment. An object in the environment may be any item with a material presence. An object is therefore to be considered broadly and includes, among other things, items such as people, animals, furniture, devices or other items that are natural in origin or man-made. A (topological) model of a given object may be of the entirety of the object or of a portion of the object. For example, part of the object may be obscured or inaccessible within the environment. In such cases, the (topological) model may be of a portion of the object which is unobscured or accessible.

The agent, e.g. portable device, may include an image capture device. Image data representative of a captured observation of the environment, e.g. as captured by the image capture device, may be processed to obtain pose data representative of a pose of the agent during the observation of the environment. The image capture device may capture visible light but may also or additionally capture IR or UV radiation. The image data may therefore be based on a captured observation of the environment in at least one of the UV, visible or IR regions of the electromagnetic spectrum. For example, the image data may include at least one of UV image data, visible image data or IR image data—or the image data may include a combination of at least one of UV, visible or IR information. The image data, for example, represents photometric characteristics of a scene, such as a brightness, intensity or color. An array of pixel values may be used to represent these photometric characteristics. The image may be grayscale or color. The image capture device may be arranged to capture images within a field of view of the image capture device, e.g. which field of view includes the object.

Any suitable image processing method may be applied to the image data to determine the pose of the agent. For example, the image data may be processed using SLAM techniques, as described above, which involve constructing or updating a map of the environment while tracking the location of the agent within the environment. There are a variety of different SLAM techniques, involving statistical approaches such as the use of a Kalman filter and a particle filter, which provide an estimate of a posterior probability function for the pose of the image capture device and parameters of the map of the environment. Other techniques involve jointly estimating the pose of the image capture device and landmark positions within the environment, such as bundle adjustment and maximum a posteriori estimation. In these examples, the pose of the agent may be taken to correspond to a pose of the image capture device. In other examples, the pose of the agent may be taken to correspond to a pose of another portion of the agent, such as another component or a fixed or otherwise predetermined portion of the agent.

In some cases, visual information (such as that obtained by the image capture device) may be combined with other information, such as orientation information obtained by an inertial measurement unit (IMU) of the agent (such as an accelerometer or gyroscope) and/or depth information obtained by a depth sensor of the agent, to obtain the pose of the agent. For example, the agent may be arranged to perform a SLAM process based on a combination of image data obtained from the image capture device and readings from at least one IMU. This may be referred to as visual-inertial SLAM. This may be more robust than pose data based solely on the image data, which may be sensitive to sudden movements of the agent, which may result in blurry images. For example, an Extended Kalman Filter (EKF) or bundle adjustment (BA) process may be used to combine image data and inertial data obtained from at least one IMU in such a way that the accuracy of the calculated pose is higher than that of a pose obtained using the image data or the inertial data separately.

As described above, a pose can represent a position and an orientation of a given agent. The pose may be represented as a 6DOF (6 degrees of freedom) transformation matrix, and may vary over time, e.g. as video data or a series of still images is recorded. For example, the agent typically has a different pose at two different times, as the agent is moved with respect to the environment to be modeled. The pose data may therefore be used to determine movement of the agent within the environment. SLAM, such as segmented SLAM, performed using the image data may be used to determine how a given object moves in the environment, such as a pose of the object within the environment. Hence, by combining this information, the pose of the agent relative to the object in the environment may be determined, even in cases where the object is moving.

The determined pose of the agent within the environment, combined with depth information describing a plurality of distances between the agent and different respective portions of one or more surfaces in the environment (e.g. one or more surfaces of one or more objects in the environment) can be used to generate a topological model of the environment. The depth data may be captured by a depth sensor, e.g. as part of the agent. Examples of a depth sensor include a time-of-flight (ToF) camera, which emits an infrared light signal and determines a depth of the environment based on the time taken for the light signal to return to the ToF camera after reflection from the environment, and a stereo camera. In other examples, the depth data may be obtained by processing image data, e.g. RGB data. For example, the depth data may be outputted by a neural network which is trained to receive RGB data as input and generate the depth data based on the RGB data. In examples, a different neural network may be implemented in combination with sparse point cloud data, e.g. as produced by a visual-inertial SLAM (VI-SLAM) method. For example, the neural network may be trained to improve and/or complete a set of depth data obtained from a depth sensor or from the neural network trained to generate depth data based on RGB data.

For example, distance values may be taken as pixel values corresponding to respective depth pixels of a depth map representative of a respective depth of the one or more surfaces in the environment relative to the agent (e.g. a reference point or plane associated with the agent). The depth map may be taken as the topological model of the environment. It is to be appreciated a depth map may provide more than a surface location in the environment. For example, a depth map may provide information about the free space between a reference plane (such as a plane associated with the agent) and the surface.

The topological model of the environment may, for example, be expressed as a mesh representation of one or more surfaces in the environment. In a mesh representation, three-dimensional objects in the environment may each be represented by a plurality of polygons, e.g. triangles, approximating the surfaces of the object.

Figure 3:
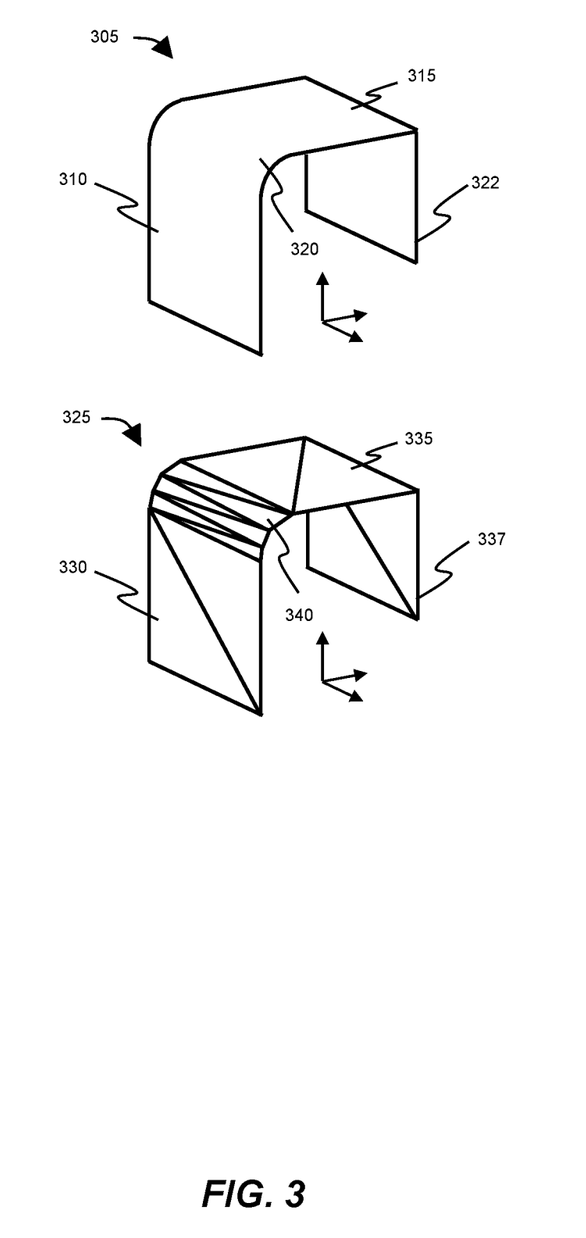
FIG. 3 shows an example of a polygon mesh representation.

FIG. 3 shows an example of such a polygon mesh representation. A three-dimensional object 305 is shown in an isometric view. The object 305 has the form of a thin sheet comprising two planar portions 310, 315 joined by a curved portion 320. One of the planar portions 315 is joined at a right angle by a third planar portion 322. The object 305 can be presented as a set of polygons 325. The polygons form a mesh, approximating the shape of the object 305. In flat regions 330, 335, 337, a relatively small number of polygons can accurately represent the corresponding region 310, 315, 322 of the object 305. However, in the curved region 340, a greater density of polygons is required to approximate the shape of the corresponding region 320 of the object 305.

In order to accurately represent a complex object that is not primarily composed of flat surfaces, such as for example a tree or a person, a very large number of polygons is typically required. Significant computing resources may be required to store and process such image data.

Generating the model of the environment as a mesh representation may involve determining a set of points, which may be termed a point cloud, associated with the three-dimensional objects in the environment. A plurality of polygons can then be determined from points of the point cloud, e.g. sets of three nearby points may be randomly connected to form a set of triangles.

The input image data may be derived using a process comprising sensing the environment, e.g. sensing a scene representative of the environment. For example, sensing the scene may comprise three-dimensionally scanning the environment including surfaces and three-dimensional objects. Alternatively, or additionally, sensing the scene may comprise determining the shapes of three-dimensional objects in the environment by combining two-dimensional images of each object with depth information. For example, a typical automated vehicle combines the outputs of various sensors, including two-dimensional cameras and depth sensors, to form a three-dimensional representation of the surrounding scene. The plurality of polygons can be determined as a representation of the sensed scene. In other cases, the input image data is derived by way of three-dimensional solid modeling processes. For example, a three-dimensional model constructed using such a process can be converted into a mesh of polygons.

Each polygon in the mesh of polygons may have associated geometric information. The geometric information of a given polygon describes the geometry of that polygon. For example, the geometric information may include the three-dimensional position of each vertex of the polygon.

In other examples, the topological model of the environment may be expressed as a voxel model, e.g. which represents each object in terms of voxels (which may be considered to correspond to volume pixels). A voxel, for example, represents a value on a regular grid in a 3D space. Each voxel may have a corresponding signed-distance function (SDF) value, which models an extent of an object within the volume. The SDF for example provides a useful surface representation of the free space between a given object in the environment and the reference plane associated with the agent. The SDF typically defines the signed distance from a point in a volume to a nearest point on the surface, where the sign delineates regions of space that are closest to a front (positive sign) or back (negative sign) of the surface. The truncated SDF (TSDF) typically defines a limited SDF near the surface and truncates the distance value where the unsigned distance is above a particular threshold. For example, the TSDF may use a given threshold (th) value that defines an interval [−th, th]. Voxels that are within this interval may be considered to belong to the object surface. in this way, the TSDF values for example indicate whether a voxel of a given 3D volume (which e.g. represents the observed environment) belongs to free space outside of the object or to filled space within the object. In further cases, the topological model may be a point cloud.

A 2D image of the topological model of the object may be obtained from the topological model, e.g. by ray-tracing using the TSDF values of a voxel model. Ray-tracing, for example, uses the pose data and the 3D volume to step along projected rays within a given step-size and to search for a threshold-crossing point as defined by the TSDF values in the 3D representation. Rendering may be dependent on a probability that a voxel belongs to a foreground (i.e. that the voxel forms part of the object being modeled). For a given object in the environment, a renderer may store a ray length of a nearest intersection with a zero-crossing point and may not search past this ray length for subsequent object instances. In this manner, occluding surfaces may be correctly rendered.

In examples in which the agent includes an image capture device arranged to obtain image data, processing the pose data and the distance/depth data may include processing the pose data, the distance/depth data, and the image data to generate the topological model of the environment. In such examples, the image data may represent at least one color image of the object or environment, and a color of the topological model may be derived from the at least one color image.

As explained above, the image data may be based on electromagnetic radiation in the UV, visible and/or IR regions of the electromagnetic spectrum. Depth information from a depth sensor may also be used to generate the topological model. Depth pixels, polygons or voxels of a topological model of the object or environment may be associated with respective colors, which may be derived from the image data. In such cases, during rendering of the 2D image of the topological model, the color of the rendered pixels may be obtained from an associated color of the voxels of the topological model of the object or environment, so as to render the pixels with a color that depends on a corresponding color of the image captured by the image capture device. For example, elements of the topological model may have a color which is the same as or otherwise corresponds to corresponding portions of the object or environment, as obtained from the image data. Furthermore, if color, visual depth (e.g. obtained using a depth sensor), UV and IR information are obtained, multiple views of the same object could be obtained. For example, a 3D model of the object and a topological model of the object could be obtained. These models may further be overlaid with or include color, UV and/or IR information.

In some examples, as part of the modeling of an environment, a map representation of the environment is derived. The map representation may be derived based at least in part on the processing of captured image data. Deriving the map representation may form part of a SLAM process. SLAM processing that employs object recognition and scene understanding, e.g. so-called "semantic SLAM", may be made more efficient by focusing processing on the objects in the scene which are more likely to move as these objects are more likely to be in a different location within the environment at a subsequent time, and thus more likely to be in a different location in a subsequently captured frame.

In some examples, modeling the environment involves obtaining an initial model of the environment, e.g. over a network such as via the Internet, and subsequently updating the model using one or more of the modeling processes described above. For example, depth data associated with an agent's environment may be obtained by the agent and processed to update the initial model of the environment. As with generating a model, updating a model of an environment may also be a computationally expensive task, e.g. requiring relatively large amounts of processing power and/or storage.

As mentioned earlier, a (topological) model of a real-world environment may be used for many different purposes, for example in various augmented reality (AR) and/or virtual reality (VR) applications. Environment models may form part of the AR Cloud project, for example, which involves implementing a real-time three-dimensional (e.g. spatial) map of the world overlaid onto the real world. This may allow AR applications ("apps") and devices that are connected to the AR Cloud to augment a user's real-world environment using virtual objects, e.g. which are anchored to specific physical locations, that persist across multiple applications ("apps") and devices: so-called "persistent virtual objects".

The AR Cloud may be implemented via a cloud computing model, whereby a "cloud" of computer system resources, e.g. data storage and computing power, is made available to users on-demand, e.g. without direct active management by the users. For example, in a cloud-based model, data centers may be made available to many users over the Internet. Large clouds typically have functions distributed over multiple locations from central servers. The persistent virtual objects of the AR Cloud will be stored centrally in the cloud computing model. Such virtual objects may be large, e.g. comprising images, videos, applications, sounds, or avatars, and thus place a high demand on the computer system resources of the AR cloud and connected AR devices. The AR Cloud may also store information about the physical locations of virtual objects and/or AR devices, e.g. as a sparse point cloud.

Figure 2:
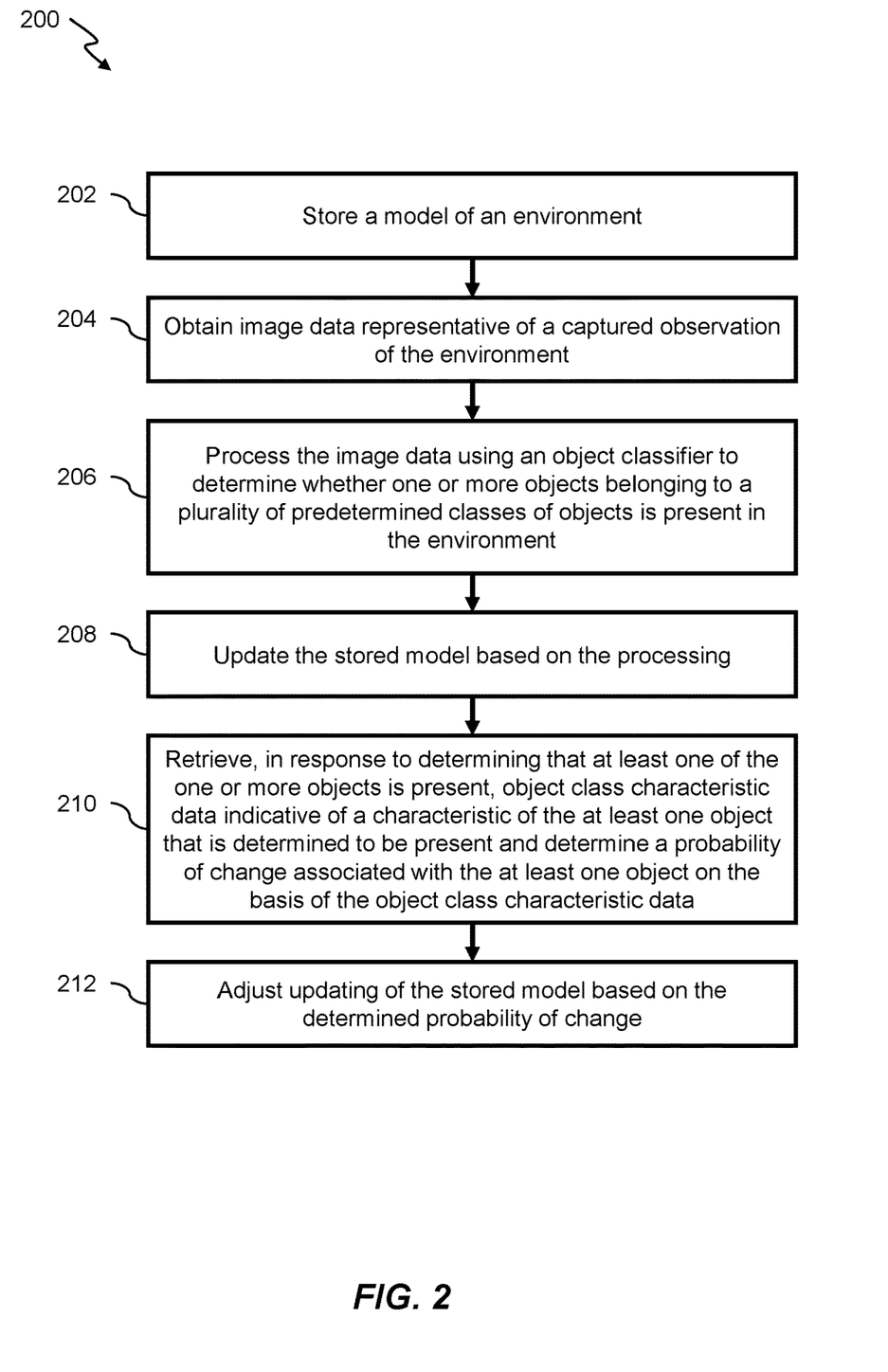
FIG. 2 shows a flow diagram illustrating a method image processing according to examples.

FIG. 2 shows schematically a method 200 according to an aspect of the present disclosure. At least one portion of the method 200 may be implemented by the image processing apparatus 110 shown in FIG. 1.

In an example, at least one portion of the method 200 is implemented by executable code, stored on a non-transitory storage medium, that includes instructions that, when executed by at least one processor, cause the at least one processor to perform the at least one portion of the method 200 described herein.

In another case, at least one portion of the method 200 is implemented by at least one application-specific integrated circuit (ASIC). The ASIC may be standard or at least partially customized. In one example, the ASIC may have a structured design. The ASIC may comprise at least one microprocessor and/or at least one memory block. In another example, the ASIC comprises at least one gate array such as a field-programmable gate array. The field-programmable gate array may comprise an array of programmable logic blocks and a hierarchy of reconfigurable interconnects. The array of programmable logic blocks may, in some examples, comprise memory elements such as flip-flops. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory (EPROM), or a portable disc.

At block 202, a model of an environment is stored. For example, the model may be stored as model data in storage. In some examples, the model may be a voxel model, which represents objects in the environment as voxels (e.g. corresponding to 'volume pixels'). In other examples, the model may be a mesh representation of the environment, as described above. A mesh representation may be built from a voxel model in some examples. Additionally, or alternatively, the mesh representation may be built from a depth map or point cloud. For example, a depth map (or point cloud) may be used to generate a mesh model directly or may be used to first generate a voxel model from which the mesh model can be generated. Mesh representations of environments may be utilized by AR applications, for example.

In some examples, storing the model of the environment involves obtaining depth data associated with the environment and processing the depth data to generate the model. As described above, the depth data may be captured by a depth sensor, such as a time-of-flight camera or stereo camera, or the depth data may be obtained by processing image data, e.g. RGB data, using a trained neural network (e.g. an RGB-D convolutional neural network).

Additionally, or alternatively, storing the model of the environment may involve obtaining the model over a network. For example, model data corresponding to at least part of the model may be downloaded via the Internet, e.g. from the AR Cloud.

In some examples of the method 200, an initial model of the environment may be obtained over a network, e.g. by downloading the model data corresponding to the initial model from a server hosting the model data. The initial model may subsequently be updated by obtaining depth data associated with the environment and processing the depth data to update the model.

At block 204, image data representative of a captured observation of the environment is obtained. In some examples, the obtained image data comprises raw image data output from an image sensor. The image data may comprise pixel data. The image data may be received from the image sensor, for example via a sensor interface. Image data received from the image sensor may be uncompressed or compressed data. Operating on raw image data enables the described methods to be performed by an ISP communicatively coupled to an image sensor and arranged to receive signal data, either directly or indirectly, from the image sensor. In some examples, the received image data comprises decoded image data output from a video decoder.

In some examples, the data representing the image is received from storage. For example, the data may comprise processed image data that was stored in storage, e.g. in a frame-buffer, after being generated by a processing entity such as an ISP, CPU or GPU. As such, the obtained image data may comprise processed image data or raw image data.

At block 206, the image data is processed using an object classifier to determine whether one or more objects belonging to a plurality of predetermined classes of objects is present in the environment. For example, where one of the plurality of predetermined classes of objects is the class "dog", the object classifier may determine whether a dog is present in the environment. The plurality of predetermined classes of objects may correspond to a set of object definitions accessible by the object classifier. The object classifier may implement an ANN, as described above with reference to the example apparatus 100 shown in FIG. 1. At block 208, the stored model is updated based on the processing performed at block 206.

At block 210, object class characteristic data is retrieved in response to determining that at least one of the one or more objects is present. The object class characteristic data is indicative of a characteristic of the object belonging to the predetermined class of objects, e.g. a probability of change. A probability of change associated with the at least one object is determined on the basis of the object class characteristic data. For example, returning to the example case where the predetermined class of objects is "dog", the object class characteristic data for the class "dog" may be indicative of a probability of change which is characteristic of a dog. The object class characteristic data for the class "dog" may thus be used to determine a probability of change for a specific dog object identified in the environment. The probability of change characteristic of an object may comprise a probability of motion for the object. There is a delineation here between the present method block and motion detection, whereby in the latter case a detection of whether a given object is in motion is made. In the present method, however, an object is recognized (e.g. classified) and a probability of change, e.g. motion, assigned to the class of objects is determined—e.g. describing how "changeable" or "movable" the object is in the environment. Processing is then adjusted based on the probability of change for the class of objects to which the recognized object belongs—as described in further detail below. For example, processing is not necessarily adjusted on whether the object is presently in motion, although this may be a secondary factor when adjusting the processing. As an illustrative example, a 'cuckoo clock' object may be identified in the environment. The cuckoo clock may currently be stationary, however the 'cuckoo clock' class of objects may have an inherent high probability of motion, e.g. compared to a regular clock, given that a cuckoo clock is typically configured to move every 15 minutes, 30 minutes or 60 minutes, for example. A 'door' object identified in the environment provides a similar example: the door may be stationary in the closed position and thus provide no response for a motion detection system. However, the door may be opened at any moment, and so the 'door' class of objects may have a probability of motion— indicated in the object class characteristic data for the 'door' class—that reflects this. Adjusting processing based on the likelihood that the door will move thus provides a different approach to adjusting the processing based simply on whether the door is currently in motion.

At block 212, updating of the stored model is adjusted based on the determined probability of change. This allows for the stored model to be updated based on how changeable the objects in the environment are likely to be, e.g. how likely it is that one or more given objects are going to move in the environment and thus change their location in the environment and the scene. Updating the stored model can mean that the model includes more recently obtained model data such that the model is more relevant, e.g. in processing the environment for an AR application. For example, the scene may not even have changed between one version of the model of the environment and an updated version of the model. However, the updated version of the model may be more relevant when using the model to do processing in the context of the environment, e.g. for an AR application running "live" in a real-world environment.

Updating the stored model, e.g. by re-scanning at least part of the environment and re-generating the model for the said at least part of the environment, can be a computationally expensive task, e.g. requiring relatively large amounts of processing power and/or storage. Thus, allowing for the updating of the model to be adjusted based on the determined probabilities of change, corresponding to the respective classes of objects that are present in the environment, means that processing resources involved in updating the model can be focussed in model regions corresponding to objects that are more likely to change, e.g. move, and thus may enable an overall reduction in processing resources for keeping the model up-to-date as a whole. Furthermore, such focussing of processing resources involved in updating the model on regions of the model that are more likely to change in the near future may additionally or alternatively allow for an increase in available processing resources for those regions of the model, thereby allowing for more efficient and/or effective modeling in those regions.

In some cases, adjusting the updating of the stored model involves selectively updating portions of the model of the environment. For example, the determined probability of change for one object in the environment may be different to the determined probability of change for another object in the environment. Thus, portions of the model of the environment corresponding to the one object may be updated differently to portions of the model of the environment corresponding to the other object. As an example, in an outside environment including multiple trees and multiple dogs, the determined probability of change for the respective dogs may be higher than the determined probability of change for the trees—e.g. because the dogs are more likely to move in the scene than the trees are. Thus, the portions of the model of the outside environment corresponding to the dog objects may be updated more frequently than the portions of the model of the outside environment corresponding to the tree objects. This allows for the computational resources involved in updating the model of the outside environment, which may be substantial for the device implementing the method 200, to be focused on the portions of the model of the environment that are more likely to change in the near future compared to other portions of the model. For example, in the present outside environment example, computational resources can be focused on updating the dog object models in the model of the outside environment more frequently than the tree object models in the model of the outside environment—because dog objects, belonging to the dog class of objects, have a higher probability of change than tree objects belonging to the tree class of objects; as indicated in the respective object class characteristic data corresponding to the dog and tree classes.

In some examples, the object class characteristic data for a given class comprises one or more of a size, a weight, or a material characteristic of the class of objects. For example, the object class characteristic data for the object class "refrigerator" may include one or more of a size value, a weight value, or a material descriptor typical of a refrigerator. In such cases, the method 200 may involve determining the probability of change based on at least one of the size, weight, or material characteristic for at least one class of objects corresponding to the at least one object determined to be present in the environment. For example, instead of obtaining a probability of change value for a class of objects directly from the object class characteristic data for that class of objects, one or more other characteristics of the class of objects (e.g. size, weight, material) may be obtained from the object class characteristic data. The probability of change value, e.g. probability of motion value, for the class of objects can then be determined based on the one or more other characteristics of the class of objects. For example, this may involve computing the probability of change value for the class of objects based on one or more other characteristics of the class of objects (e.g. size, weight, material) as inputs.

In some examples, one or more other characteristics (e.g. size, weight, material) of a particular object, belonging to the predetermined class of objects, may be used to modify the probability of change value for the object in the scene. For example, an initial probability of motion may be assigned to the object based on the probability of motion for the class of objects to which the object belongs—e.g. the initial probability of motion may be obtained as a probability of motion value in the object class characteristic data for that class. One or more other characteristics of the object may then be determined, e.g. based on observation of the object in the environment and/or other characteristic values stored as part of the object class characteristic data for the class of objects to which the object belongs, and used to modify the initial probability of motion assigned to the object. For example, a dumbbell object detected in an indoor gym environment may have an initial probability of motion value assigned thereto based on the probability of motion for the entire "dumbbell" class of objects. An object detection system may, however, observe the particular dumbbell object in the indoor gym environment and determine a size of the dumbbell object. The size of the dumbbell may then be used to modify the probability of motion value assigned to that dumbbell, e.g. the largest dumbbells in the gym may have a lower probability of being moved around the environment.

In some examples, the object class characteristic data may be updated based on a machine learning process. For example, the recognized object may be observed in the environment—e.g. by an object detection system—to produce "learned" object motion data. The learned object motion data for the given object may be used to update the object class characteristic data, e.g. indicative of the probability of change characteristic, of the entire class of objects to which the recognized object belongs. This can also be scaled up, such that a plurality of objects belonging to the same class may be observed in the same or different environments to produce learned object motion data for that class of objects. The learned object motion data can be used to update the object class characteristic data, indicative of the probability of change characteristic, for the class of objects to which the plurality of objects belong—e.g. to set a 'default' probability of change value for the class of objects. The machine learning process may be based on a machine learning algorithm that includes, but is not limited to, one or more of: supervised learning, unsupervised learning, semi-supervised learning, reinforcement learning, self-learning, or feature learning. The machine learning process may implement a model that includes, but is not limited to, one or more of: an artificial neural network (ANN; described above), a support vector machine (SVM), a relevance vector machine (RVM), k-nearest neighbors (k-NN), a decision tree, or a Bayesian network.

In some examples, the method 200 involves processing the image data using the object classifier to determine whether a specific object belonging to the predetermined class of objects is present in the environment. For example, as described above, an object classifier may allow particular instances of an object belonging to an object class to be identified. Where the class is "person", for example, the object classifier may be used to detect a specific person, not just whether a person is present, in the scene. A probability of change associated with the specific object may then be determined on the basis of the object class characteristic data for the class of objects. This probability of change may be an initial probability of change determined for the specific object based on the probability of change for the class of objects to which the specific object belongs—as described in the example above. A machine learning process may then be used to update the object characteristic data, e.g. characteristic data associated with the specific object, based on a machine learning process. In examples, the machine learning process receives object observation data obtained by observing the specific object in the environment, e.g. using an image capture device. The description above relating to a machine learning process applies to these examples also.

In examples, adjusting updating of the stored model comprises involves processing the image data to determine a location of the recognized object in the environment. For example, image segmentation may be used to localize the recognized object in the image. In some cases, e.g. where the object classifier is implemented by a CNN model, a deconvolutional neural network may be used to localize the recognized object in the image or scene. A deconvolutional neural network (a type of neural network also known as a "deconvolutional network" or a "transposed convolutional neural network") may be an inverse CNN, e.g. a neural network arranged to perform an inverse convolutional model.

The deconvolutional neural network may be trained to determine a location of a recognized object in an image frame based on obtained object data associated with the image. Kernels may be deconvolved with image data (e.g. object data, feature data) input to a layer of the deconvolutional neural network. For example, deconvolutional layers of the deconvolutional neural network may be arranged to apply deconvolution operations on the data received thereby in order to localize the object recognized by the CNN classifier. The output layer of the deconvolutional neural network may correspond to a location, e.g. a region, of the image or feature map that is determined, e.g. estimated, to contain the object.

Pose estimation may additionally or alternatively be used to localize the object in the environment, as described in examples above. The location of the object in the environment may be expressed relative to a three-dimensional coordinate system projected onto the environment, for example.

Once the object has been localized in the environment, a portion of the stored model of the environment that corresponds to the location of the object in the environment can be determined. For example, a three-dimensional coordinate system may be projected onto the environment and used to map between the real-world environment and the model thereof. Thus, the coordinates of an object localized in the real-world environment may be used to determine the coordinates of a topological model of the object as part of the model of the larger environment.

The method 200 may involve adjusting a frequency at which the portion of the model of the environment that corresponds to the location of the object in the environment is updated. For example, where a chair object is recognized and localized in the environment, the portion of the stored model of the environment corresponding to the chair object—e.g. a topological model of the chair object—may be updated at a different frequency, e.g. relative to one or more other portions of the model of the environment. In some cases, the update frequency is adjusted as a function of the determined probability of motion associated with the recognized object. For example, the function could be linear such that a first object moving at half a speed of a second object means updating the model of the first object at half the rate at which the second model is updated. However, the function may be more complex in other examples, e.g. involving a dynamic relationship with the update frequency and determined probability of motion for each object as variables.

In some examples, the method 200 involves processing the image data to determine a location of the object in the captured observation of the environment. For example, the recognized object may be localized in the captured observation, e.g. in an image captured by an image capture device. As described above, image segmentation and/or a deconvolutional neural network (e.g. where the object classifier is implemented by a CNN model) may be used to localize the recognized object in the image or scene.

With the object localized within the captured observation of the environment, processing of at least a portion of further image data, representative of a further observation of the environment captured subsequent to the initial observation, may be adjusted. Such adjustment to the processing of image data may be made at an image signal processor of an image processing apparatus, for example. The portion of the further image data may be determined based on the location of the object in the captured observation of the environment. For example, a bounding box may be implemented when localizing the object in the captured observation of the environment. Thus, the portion of the further image data may be determined based on the bounding box, corresponding to the recognized object, in the initial captured scene. Object tracking may be implemented to estimate where the recognized object is likely to be in the further image data, e.g. a subsequent image frame. In some cases, even if the recognized object is motive, its motion may be below a predetermined threshold (e.g. the object may not be motive enough) to warrant increased processing of the portions of subsequent image frames corresponding the object, e.g. the projected bounding box associated with the object in the subsequent image frames.

In examples, adjusting the processing of at least the portion of the further image data involves processing at least the portion of the further image data at a different processing rate. Additionally, or alternatively, adjusting the processing of at least the portion of the further image data involves processing at least the portion of the further image data at a different level of visual quality. For example, at least the portion of the further image data may be processed at a different spatial and/or temporal resolution, and/or at a different processing rate. A processing rate may correspond to a frequency with which data is processed. In examples, processing given image data at a different level of visual quality may include applying a different level of denoising to the given image data.

Additionally, or alternatively, adjusting the processing of at least the portion of the further image data involves compressing at least the portion of the further image data at a different compression ratio. Additionally, or alternatively, adjusting the processing of at least the portion of the further image data involves not processing at least the portion of the further image data. Such adjustments in processing at least the portion of the further image data may be made at the ISP. For example, not processing at least the portion of the further image data may involve discarding at least the portion of the further image data before the further image data is sent to the ISP.

In some examples, the recognized object is a first object in the environment and the predetermined class of objects is one of a plurality of classes of objects. For example, multiple classes of objects may be stored in storage accessible by an object classifier. In such cases, the method 200 may involve processing the image data using the object classifier to determine whether a second object is present in the environment. The second object may belong to the same, or a different, class of objects in the plurality of classes of objects to the first object. For example, the first and second object may both be "person" objects, resulting from recognition by the object classifier of two objects belong to the "person" class of objects being present in the scene. In another case, the first object may be a person, but the second object may belong to a different class of objects than the "person" class, e.g. a table or a television.

The method 200 may further involve modifying the probability of change associated with the first object in response to the determination that the second object is present in the environment. For example, an initial probability of change may be assigned to the first object based on the probability of motion for the class of objects to which the first object belongs—as described in examples above. The initial probability of change for the first object may subsequently be updated based on the second object being present. In some cases, the modification of the initial probability of change may depend on what class of object the second object belongs to and/or object class characteristic data that is associated with that class. For example, a basketball object may be recognized in an environment and an initial probability of motion for the basketball object may be determined based on object class characteristic data for the basketball object class, e.g. a stored probability of motion value (which may have been manually assigned and/or learned via machine learning, as described) and/or one or more other characteristics stored for the class of objects (e.g. basketballs in this example). If a person then enters the environment, e.g. a "person" object is recognized by the object classifier, the initial probability of motion for the basketball object may be modified (e.g. increased) based on the person being present, since the system knows that basketball objects are more likely to move when a person object is present (which knowledge may be represented as information/instructions inputted manually into the system and/or learned by the system, e.g. by machine learning).

In some cases, a relation between the first object and the second object may be determined. For example, the relation may describe the way in which the first and second objects are connected and/or their effect on, or relevance to, one another. The relation (or "connection" or "link") between the first object and the second object may be stored as object relation data, e.g. in a database. In some cases, the object relation data may include detected data, e.g. a measured distance between two objects in the environment providing a spatial relation between the two objects, and/or stored data, e.g. a weight of each of the objects and/or a weight difference between two objects providing a potential causal relation between the objects—such as which object can cause which other object to move.

In examples, the method 200 involves modifying the probability of change associated with the first object based on the determined relation. For example, the first object may be recognized by the object classifier as a person and the second object may be recognized as a pen. The person is far more likely to cause the pen to move than the pen is to cause the person to move, e.g. based on weight or size difference, or simply a semantic relation between the objects: people tend to pick up pens in an environment. A relative distance between the person and the pen can also influence the probability of motion for the pen, e.g. the pen is more likely to be moved when the person is closer to the pen. Taking this example further, the probability of motion for the pen can increase by a greater amount when the detected person is within a threshold distance of the pen, e.g. within arm's reach. Thus, the relation between two objects may be complex and influenced by multiple factors.

In some cases, modifying the probability of change may involve applying a modifier value, e.g. corresponding to the determined relation, to the probability of change for the first object (which may have been determined based on the object class characteristic data for the class of objects to which the first object belongs). For example, the modifier value may be stored in a database, lookup table, or other storage object at a storage location (e.g. a lookup table cell) having attributes corresponding to the first object and the second object. Such modifier values may be inputted manually into the system and/or learned by the system, e.g. by a machine learning process as described herein. The stored modifier values may thus represent the system's knowledge, referenced above in the basketball example, that a given object is more likely to move when one or more certain other objects are either simply present in the environment, are within a threshold distance of the given object, are moving above a threshold speed, are moving toward the given object, etc. These factors may be taken as inputs to a machine learning process, with the modifier values taken as outputs, such that the amount of modification of the probability of motion for a given object based on the observed presence and/or behavior of one or more other objects can be learned by the machine learning process. In some example, the probability of motion values can be taken as the outputs of the machine learning process and thus learned directly, e.g. without the intermediate modifier values being used.

In examples, the second object recognized in the environment belongs to a different, second, predetermined class of objects and the method 200 may include retrieving second object class characteristic data indicative of a second probability of change which is characteristic of the second class of objects. Thus, determining the relation between the first object and the second object may involve comparing the first object class characteristic data with the second object class characteristic data. As described above in the example involving a person and a pen recognized in the environment, typical weight values for the person and pen (e.g. first and second objects)—stored as part of the person and pen object class characteristic data, respectively—may be compared to determine the relation between the person and pen objects. For example, it may be determined that the person is likely to weigh around 70 kilograms (kg) and the pen is likely to weigh around 7 grams (0.007 kg) based on stored weight values in the respective person and pen object class characteristic data. Thus, the pen object may be determined to be a factor of 10,000 lighter than the person object and so the pen may be more likely to be moved by the person than the other way around.

As described in examples above, semantic relations between classes of objects may be stored and accessible by the object classifier and/or wider object detection system (described in examples herein with reference to FIG. 1). Such semantic relations between object classes may be manually specified in some cases, e.g. a user may specify that a person object is more likely to move computer equipment objects than a dog object is, for example. The user may specify such semantic relations between object classes by inputting relation data, e.g. as part of the object class characteristic data for the relevant object classes, into the object classifier and/or wider object detection system.

Additionally, or alternatively, such semantic relations between object classes may be determined by a machine learning process, e.g. implementing a supervised learning, unsupervised learning, semi-supervised learning, reinforcement learning, self-learning, or feature learning algorithm via an ANN, SVM, RVM, k-NN, decision tree, or Bayesian network model. For example, a rule-based machine learning method may be used to discover and/or maintain the relations between object classes, e.g. where the object classes are variables in a stored database of object class characteristic data.

Rule-based machine learning is a general term for any machine learning method that identifies, learns, or evolves "rules" to store, manipulate or apply knowledge. A rule-based machine learning algorithm may identify and utilize of a set of relational rules that collectively represent the knowledge captured by the system. This is in contrast to other machine learning algorithms that commonly identify a singular model that can be universally applied to any instance in order to make a prediction. Rule-based machine learning approaches include learning classifier systems (LCS), association rule learning, and Inductive logic programming (ILP).

An LCS typically combine a discovery component with a learning component (e.g. performing either supervised learning, reinforcement learning, or unsupervised learning, as described above). The LCS may identify a set of context-dependent rules that collectively store and apply knowledge in a piecewise manner in order to make predictions (e.g. classification of objects, modeling behavior of object classes). This approach allows a complex solution space to be broken up into smaller, simpler parts.

Association rule learning is intended to identify strong rules discovered in databases, e.g. in a stored database of object class characteristic data, using some measure of "interestingness". Based on the concept of strong rules, association rules may be introduced for discovering regularities between objects, belonging to their respective object classes, interacting in an environment. For example, a rule {person, mobile device} {person moves mobile device} found by analyzing "person" objects and "mobile device" objects in one or more environments could indicate that if a person object and a mobile device object are both detected in a scene, the person object is likely to cause the mobile device object to move.

Inductive logic programming (ILP) is another approach to rule-learning using logic programming as a uniform representation for input examples, background knowledge, and hypotheses. Given an encoding of the known background knowledge and a set of examples represented as a logical database of facts, an ILP system may derive a hypothesized logic program that entails all positive and no negative examples.

By implementing such active learning, e.g. based on rule-learning or some other machine learning process, the system can evolve the database of object class characteristic data to improve motion prediction for the classes of objects. This can lead to increased computational efficiency, e.g. by saving processing in areas of the scene that are less likely to change than other areas because the objects located there are less likely to move in the environment than other objects. Improving the motion prediction for the classes of objects can also lead to a higher performance accuracy, e.g. because computational resources can be focused on the areas of the scene that are more likely to change than other areas because the objects located there are more likely to move in the environment than other objects.

The semantic relations between object classes may be built up into a "relation tree" that simulates a hierarchical tree structure, with a root object class (e.g. the environment type, or fundamental inherent objects of the environment, represented as an object class) and subtrees of children object classes with parent nodes, represented as a set of linked nodes. Such an object class relation tree may thus define which objects in an environment are able to influence which other objects' respective probability of motion, and possibly by how much (e.g. the relational links between object class nodes may represent the probability modifier values described earlier)

The above embodiments are to be understood as illustrative examples. Further embodiments are envisaged. For example, although in the embodiments described above a probability of motion is provided as the main example of a probability of change, other examples are envisaged. For example, a probability of change may comprise a probability that a class of objects may change color—e.g. a set of traffic lights may have a low probability of motion but a high probability of changing color. A change in size, e.g. relative to the environment and/or captured image, is another example of a non-motive kind of change which may influence a probability of change for a given class of objects.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of image processing comprising:
   storing a model of an environment;
   obtaining image data representative of a captured observation of the environment;
   processing the image data using an object classifier to determine whether one or more objects belonging to a plurality of predetermined classes of objects is present in the environment;
   updating the stored model based on the processing;
   in response to determining that at least one of the one or more objects is present, retrieving object class characteristic data indicative of a characteristic of the at least one object that is determined to be present and determining a probability of change associated with the at least one object on the basis of the object class characteristic data, wherein the object class characteristic data comprises one or more of a size, a weight, or a material characteristic for a given class of the plurality of predetermined classes of objects, and the method comprises determining the probability of change based on at least one of the size, weight, or material characteristic for at least one class of objects corresponding to the at least one object that is determined to be present; and
   adjusting the updating of the stored model based on the determined probability of change.

2. A method according to claim 1, wherein updating of the stored model comprises selectively updating portions of the model of the environment.

3. A method according to claim 1, wherein adjusting the updating of the stored model comprises:
   processing the image data to determine a location of the at least one object in the environment;
   determining a portion of the model corresponding to the location of the at least one object in the environment; and
   adjusting a frequency at which the portion of the model is updated.

4. A method according to claim 3, wherein the frequency is adjusted as a function of the determined probability of change associated with the at least one object.

5. A method according to claim 1, wherein storing the model of the environment comprises at least one of:
   obtaining depth data associated with the environment and processing the depth data to generate the model;
   obtaining initial image data associated with the environment and processing the initial image data to generate the model; or
   obtaining the model over a network.

6. A method according to claim 1, comprising updating the object class characteristic data based on a machine learning process.

7. A method according to claim 1, comprising:
   processing the image data using the object classifier to determine whether a specific object belonging to the plurality of predetermined classes of objects is present in the environment;
   determining a probability of change associated with the specific object on the basis of the object class characteristic data; and
   updating the object characteristic data based on a machine learning process.

8. A method according to claim 7, wherein the machine learning process receives object observation data obtained by observing the specific object in the environment with an image capture device.

9. A method according to claim 1, wherein the one or more objects comprises a first object and a second object belonging to the same, or different, class of objects in the plurality of classes of objects, the method comprising:
   in response to determining that the second object is present, modifying the determined probability of change associated with the first object.

10. A method according to claim 9, comprising:
    determining a relation between the first object and the second object; and
    modifying the probability of change associated with the first object based on the determined relation.

11. A method according to claim 10,
    wherein determining the relation between the first object and the second object comprises comparing the object class characteristic data of the first and second objects.

12. A method according to claim 1, wherein adjusting the updating of the stored model comprises:
    processing the image data to determine a location of the at least one object in the captured observation of the environment; and adjusting processing of at least a portion of further image data, the further image data representative of a further observation of the environment captured at a later time, wherein the portion of the further image data is determined based on the location of the at least one object in the captured observation of the environment.

13. A method according to claim 12, wherein adjusting the processing of at least the portion of the further image data comprises one or more of:
processing at least the portion of the further image data at a different processing rate;
processing at least the portion of the further image data at a different level of visual quality;
compressing at least the portion of the further image data at a different compression ratio; or
not processing at least the portion of the further image data.

14. Apparatus for processing image data, the apparatus comprising:
storage to store a model of an environment;
a receiver to receive image data representative of a captured observation of the environment; and
a processor arranged to:
process the image data to determine whether one or more objects belonging to a plurality of predetermined classes of objects is present in the environment;
update the stored model based on the image processing;
retrieve, in response to determining that at least one of the one or more objects is present, object class characteristic data indicative of a characteristic of the at least one object that is determined to be present, wherein the object class characteristic data comprises one or more of a size, a weight, or a material characteristic for a given class of the plurality of predetermined classes of objects;
determine a probability of change associated with the at least one object based on the object class characteristic data, wherein the probability of change is determined based on at least one of the size, weight, or material characteristic for at least one class of objects corresponding to the at least one object that is determined to be present; and
adjust the updating of the stored model based on the determined probability of change.

15. Apparatus according to claim 14, the apparatus comprising at least one of:
a model generator to obtain at least one of depth data or initial image data associated with the environment and to process the at least one of the depth data or initial image data to generate the model; or
a network interface to obtain the model via a network.

16. Apparatus according to claim 14, wherein the processor is arranged to:
process the image data to determine a location of the at least one object in the captured observation of the environment; and
adjust processing of at least a portion of further image data, the further image data representative of a further captured observation of the environment captured subsequent to the captured observation, wherein the portion of the further image data is determined based on the location of the at least one object in at least one of the captured observation or the further captured observation of the environment.

17. Apparatus according to claim 16, the apparatus comprising an image signal processor, wherein adjusting processing of image data comprises adjusting processing of the image data at the image signal processor.

18. Apparatus according to claim 17, wherein adjusting processing of image data at the image signal processor comprises one or more of:
processing the image data at a different processing rate;
processing the image data at a different level of visual quality;
compressing the image data at a different compression ratio; or
not processing the image data at the image signal processor.

19. A non-transitory computer-readable medium comprising computer-executable instructions which, when executed by a processor of a computing device, cause the processor to perform a method comprising:
storing a model of an environment;
obtaining image data representative of a captured observation of the environment;
processing the image data using an object classifier to determine whether one or more objects belonging to a plurality of predetermined classes of objects is present in the environment;
updating the stored model based on the processing;
in response to determining that at least one of the one or more objects is present, retrieving object class characteristic data indicative of a characteristic of the at least one object that is determined to be present and determining a probability of change associated with the at least one object on the basis of the object class characteristic data, wherein the object class characteristic data comprises one or more of a size, a weight, or a material characteristic for a given class of the plurality of predetermined classes of objects, and the method comprises determining the probability of change based on at least one of the size, weight, or material characteristic for at least one class of objects corresponding to the at least one object that is determined to be present; and
adjusting the updating of the stored model based on the determined probability of change.

* * * * *